United States Patent

Asa et al.

[11] Patent Number: 5,654,887
[45] Date of Patent: Aug. 5, 1997

[54] BRAKING FORCE CONTROLLER FOR ELECTRIC VEHICLE

[75] Inventors: Hironori Asa; Mitsuo Inagaki, both of Okazaki; Naoji Konaga, Nishio; Toshitaka Tanahashi, Okazaki, all of Japan

[73] Assignees: Nippondenso Co., Ltd., Kariya; Nippon Soken, Inc., Nishio, both of Japan

[21] Appl. No.: 319,551

[22] Filed: Oct. 7, 1994

[30] Foreign Application Priority Data

Oct. 8, 1993 [JP] Japan .................. 5-277611

[51] Int. Cl.⁶ ............................................. B60L 7/10
[52] U.S. Cl. ................... 364/424.026; 364/426.01; 180/65.3; 303/152; 318/376
[58] Field of Search .................. 364/426.01, 426.02, 364/424.05; 318/375, 376; 303/3, 20, 121, 152; 180/65.1, 65.3, 65.4

[56] References Cited

U.S. PATENT DOCUMENTS

| | | | |
|---|---|---|---|
| 4,095,154 | 6/1978 | Williamson | 318/376 |
| 4,405,886 | 9/1983 | Williamson | 318/376 |
| 4,423,363 | 12/1983 | Clark et al. | 318/375 |
| 4,479,080 | 10/1984 | Lambert | 318/376 X |
| 4,730,151 | 3/1988 | Florey et al. | 318/376 |
| 5,264,764 | 11/1993 | Kuang | 180/65.4 X |
| 5,291,960 | 3/1994 | Brandenburg et al. | 180/65.4 X |
| 5,322,352 | 6/1994 | Ohno et al. | 303/3 |
| 5,399,000 | 3/1995 | Aoki et al. | 303/3 |
| 5,433,512 | 7/1995 | Aoki et al. | 303/3 |
| 5,450,324 | 9/1995 | Cikanek | 364/426.02 |
| 5,476,310 | 12/1995 | Ohtsu et al. | 303/3 |
| 5,511,859 | 4/1996 | Kade et al. | 303/3 |

FOREIGN PATENT DOCUMENTS

| | | |
|---|---|---|
| 482515 | 1/1973 | Japan . |
| 52501 | 1/1993 | Japan . |

*Primary Examiner*—Collin W. Park
*Attorney, Agent, or Firm*—Cushman, Darby & Cushman IP Group of Pillsbury Madison & Sutro LLP

[57] ABSTRACT

A braking force controller for an electric vehicle properly carries out an anti-lock braking operation by keeping a slip ratio in a stable range. The vehicle has a motor 1 to drive wheels. A central controller 4 calculates regenerative energy according to output signals from an ammeter 51 and a voltmeter 52. If a brake sensor 62 detects a sudden braking operation, the central controller 4 controls the regenerative braking force of the motor 1 through a motor controller 2, to maintain the regenerative energy around a maximal value.

8 Claims, 8 Drawing Sheets

BRAKING FORCE CONTROLLER FOR ELECTRIC VEHICLE

BACKGROUND OF THE INVENTION

1. Field of the Invention

The present invention relates to a braking force controller for an electric vehicle, and particularly, to a braking force controller that uses the regenerative braking force of a motor of the vehicle.

2. Description of the Related Art

Some electric vehicles employ a hydraulic brake, such as the ones used in ordinary gasoline-powered vehicles, as an anti-lock brake, and stops a regenerative braking action of a motor of the vehicle during an anti-lock braking operation. This is disadvantageous because the best features of an electric vehicle, i.e., using braking forces as energy to charge a battery, is wasted.

Various anti-lock braking techniques using the regenerative braking action of a vehicle motor have been proposed. For example, Japanese Unexamined Patent Publication (Kokai) No. 48-2515 (a first prior art) detects the speed of a driving wheel, estimates a vehicle speed and a slip ratio according to the detected speed, and controls regenerative braking force according to the vehicle speed and slip ratio. Japanese Unexamined Utility Model Publication (Kokai) No. 5-2501 (a second prior art) detects a difference between the speeds of driving and driven wheels, calculates a slip ratio according to the difference, and controls regenerative braking force according to the slip ratio.

The first prior art is inaccurate in estimating a vehicle speed according to a driving wheel speed, so that it is incapable of regeneratively braking a vehicle at an optimum slip ratio of about 0.2 at which wheel-to-road friction becomes maximum. The second prior art is also inaccurate in detecting a vehicle speed because a wheel speed does not correctly correspond to a vehicle speed when mechanical braking force on driven wheels is large, so that the second prior art is also incapable of regeneratively braking a vehicle at an optimum slip ratio.

SUMMARY OF THE INVENTION

An object of the present invention is to provide a braking force controller for an electric vehicle, to carry out an anti-lock braking operation while keeping wheel-to-road friction at a maximum value.

In order to accomplish the object, the present invention provides a braking force controller for an electric vehicle having a motor 1 for driving wheels and a motor controller 2 for supplying driving power to the motor 1. The braking force controller has a detector 62 for detecting a sudden braking operation, detectors 51, 52 for detecting the regenerative energy of the motor, and a central controller 4 for providing the motor controller with a signal to control the regenerative braking force of the motor 1 during the sudden braking operation detected by the detector 62, so that the regenerative energy detected by the detectors 51, 52 stays at a maximum value.

DESCRIPTION OF THE PREFERRED EMBODIMENTS

Braking force controllers for an electric vehicle according to embodiments of the present invention will be explained in detail with reference to the drawings.

Figure 1:
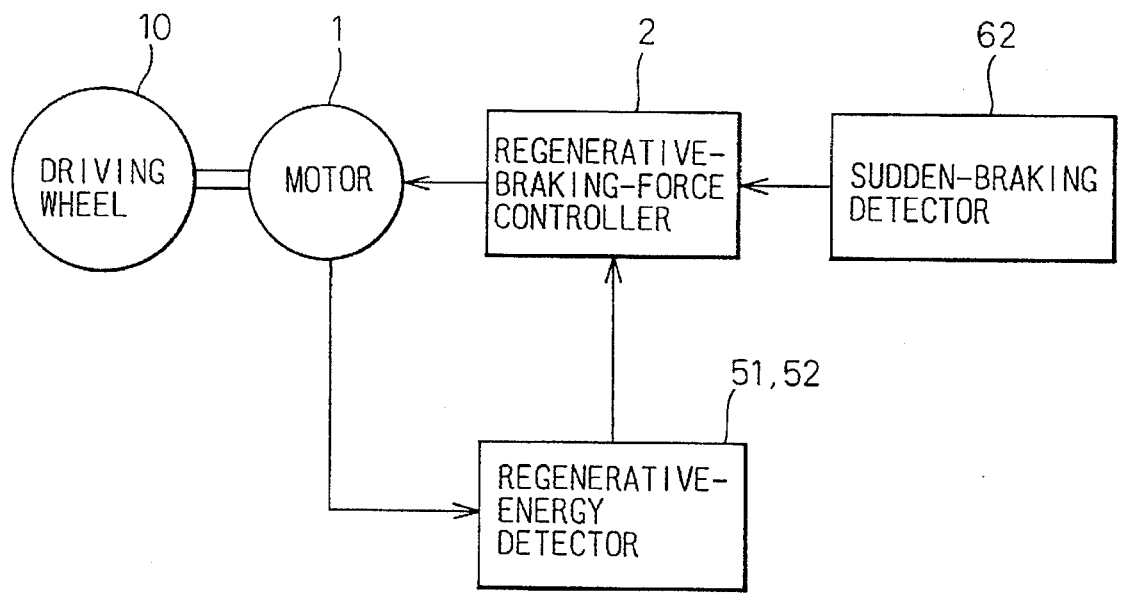
FIG. 1 is a block diagram showing the principle of a braking force controller for an electric vehicle according to the present invention.

FIG. 1 is a block diagram showing the principle of a braking force controller for an electric vehicle according to the present invention. The electric vehicle has a motor 1 connected to a driving wheel 10. Detectors 51 and 52 detect the regenerative energy of the motor 1. A detector 62 detects a sudden braking operation. A motor controller 2 controls the regenerative braking force of the motor 1 so that the regenerative energy is kept at a maximum value.

The inventors found that a frictional coefficient between a braked wheel and a road becomes a maximum value when regenerative energy due to a regenerative braking action reaches a maximum value. Accordingly, the wheel-to-road frictional coefficient will be kept at the maximum value if the regenerative braking force of a vehicle motor is controlled to maintain maximum regenerative energy. This results in realizing an anti-lock braking action.

During the anti-lock braking action, the regenerative energy is used to charge a battery, to thereby extend the travelling distance of the electric vehicle.

Figure 2:
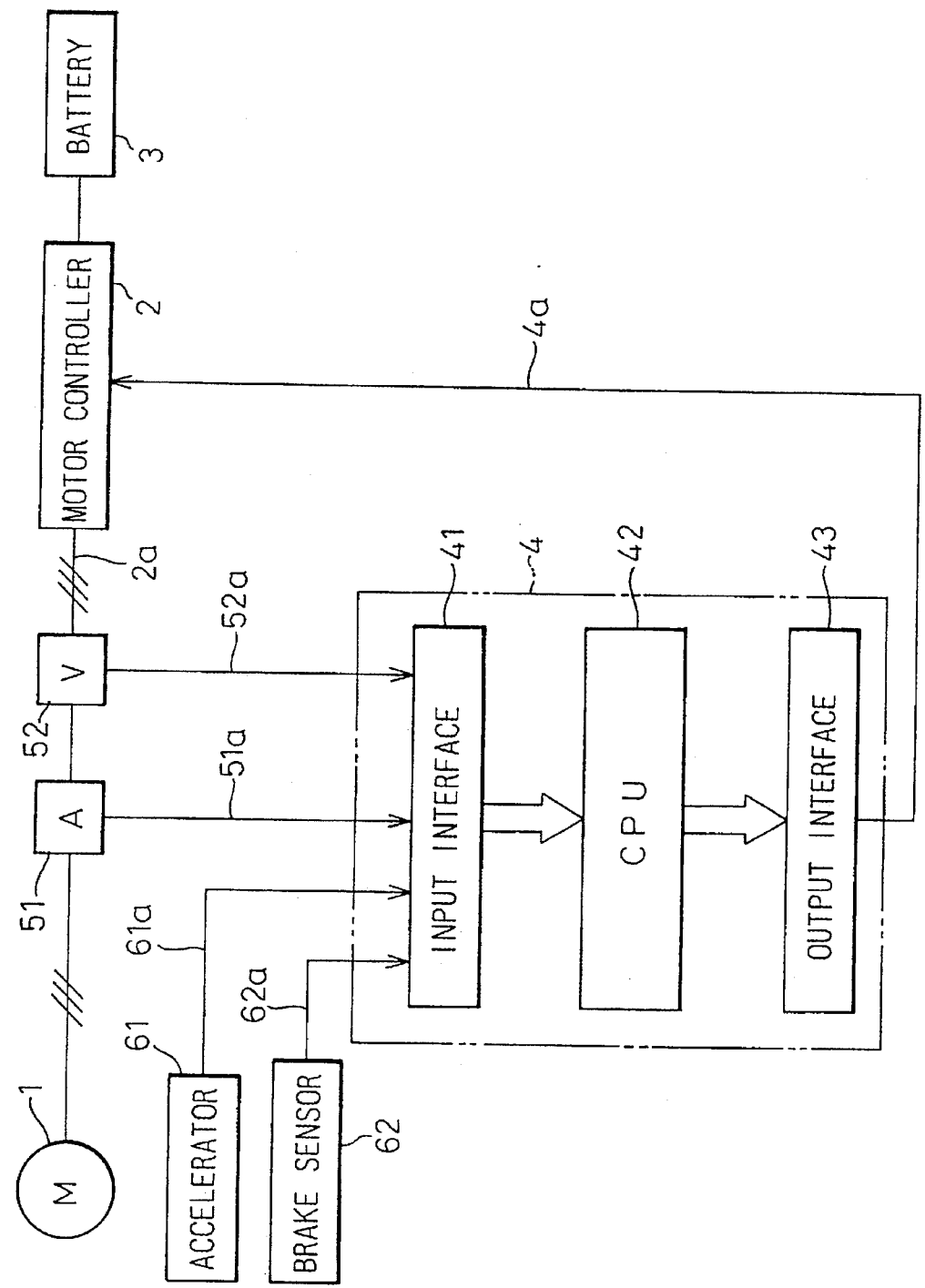
FIG. 2 is a block diagram showing a braking force controller according to a first embodiment of the present invention.

FIG. 2 shows a braking force controller for an electric vehicle according to the first embodiment of the present invention. A motor 1 for driving the wheels of the vehicle is a three-phase induction motor connected to a motor controller 2. The motor controller 2 receives direct-current power from a battery 3 and provides the motor 1 with three-phase driving power 2a of predetermined frequency in response to an output signal 4a from a central controller 4. A slip S of the motor 1 is expressed as follows:

$$S = (f0 - f)/f0 \tag{1}$$

where f0 is the frequency of the driving power, and f is the rotational frequency of the motor. If S>0, it is driving force control, and if S<0, it is braking force control.

An ammeter 51 and a voltmeter 52 are arranged in an electric wire extending from the motor controller 2 to the motor 1. The ammeter 51 and voltmeter 52 provide an input interface 41 of the central controller 4 with output signals 51a and 52a, respectively. The input interface 41 also receives the output 61a of an acceleration sensor 61 that indicates a depression of an accelerator, and the output 62a of a brake sensor 62 that indicates a depression of a brake pedal. The ammeter 51 and voltmeter 52 form a regenerative energy detector according to the present invention.

The central controller 4 has a CPU 42 that determines a slip S of the motor 1 according to the signals 51a, 52a, 61a, and 62a, and provides the motor controller 2 with an output signal 4a through an output interface 43, to achieve the slip S.

The relationship between a wheel-to-road frictional coefficient $\mu$ and the regenerative energy P2 of the motor 1 will now be explained.

Figure 3:
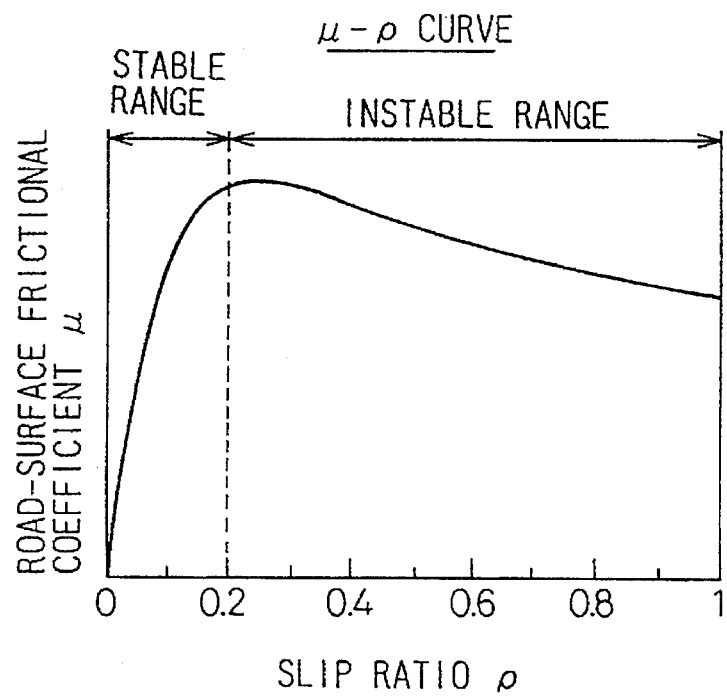
FIG. 3 is a graph showing the relationship between a slip ratio and a wheel-to-road frictional coefficient.

FIG. 3 shows the relationship between the slip ratio $\rho$ of a wheel and the wheel-to-road frictional coefficient $\mu$. While the slip ratio $\rho$ is in the range of 0 to about 0.2, the frictional coefficient $\mu$ increases as the slip ratio $\rho$ increases. This range is a stable range. When the slip ratio $\rho$ reaches about 0.2, the frictional coefficient $\mu$ shows a maximum value. Thereafter, an instable range starts in which the frictional coefficient $\mu$ decreases as the slip ratio $\rho$ increases. It is preferable to carry out braking control in the stable range. It is also preferable to carry out a sudden braking operation with the slip ratio $\rho$ being kept around about 0.2 to maintain the frictional coefficient $\mu$ around the maximum value. This results in shortening a braking distance and realizing an anti-lock braking action.

The relationship between a braking force F applied to the vehicle and the wheel-to-road frictional coefficient $\mu$ is expressed as follows:

$$F = \mu \cdot W \cdot g (N) \quad (2)$$

where W is the weight (Kg) of the vehicle, and g is the acceleration of gravity (m/s).

The relationship between a motor braking torque T and the braking force F is expressed as follows:

$$T = F \cdot r/i (N/m) \quad (3)$$

where r is the radius of a wheel, and i is a transmission gear ratio.

Accordingly, the motor braking torque T and wheel-to-road frictional coefficient $\mu$ having the following proportional relationship:

$$T = K1 \cdot \mu \quad (4)$$

where K1=W·g·r/i

The relationship between motor braking energy P1 and the motor braking torque T is expressed as follows:

$$P1 = K2 \cdot N \cdot T (W) \quad (5)$$

where K2 is a proportionality factor, and n is a motor revolution speed (rpm).

The motor regenerative energy P2 is expressed as follows:

$$P2 = \mu m \cdot K2 \cdot n \cdot T(W) \quad (6)$$

where $\mu m$ is the efficiency of the motor during the regenerative action.

The slip ratio $\rho$ and motor revolution speed n during a braking operation are expressed as follows:

$$n = (1-\rho) \cdot n0 \quad (7)$$

where n0 is a motor revolution speed before the braking operation.

According to the expressions (4) and (6), the relationship between the slip ratio $\rho$ and the motor regenerative energy P2 is expressed as follows:

$$P2 = K3 \cdot (1-\rho) \cdot \mu \quad (8)$$

where K3=$\mu m \cdot K1 \cdot K2 \cdot n0$.

Figure 4:
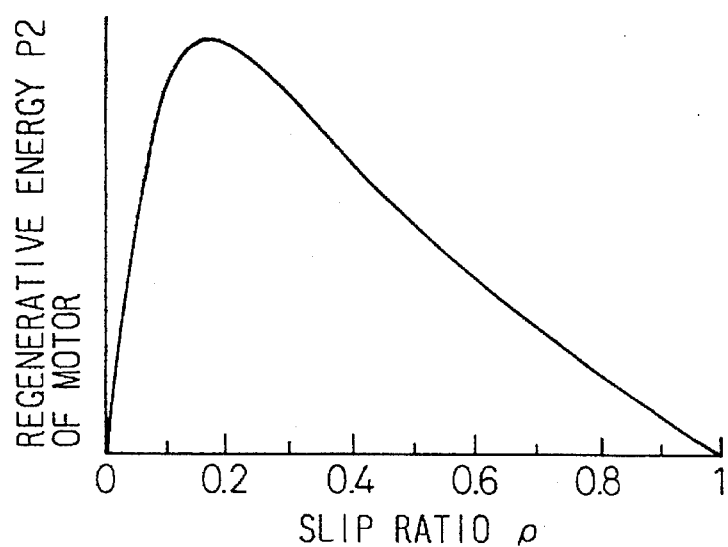
FIG. 4 is a graph showing the relationship between a slip ratio and the regenerative energy of a motor.
Figure 5:
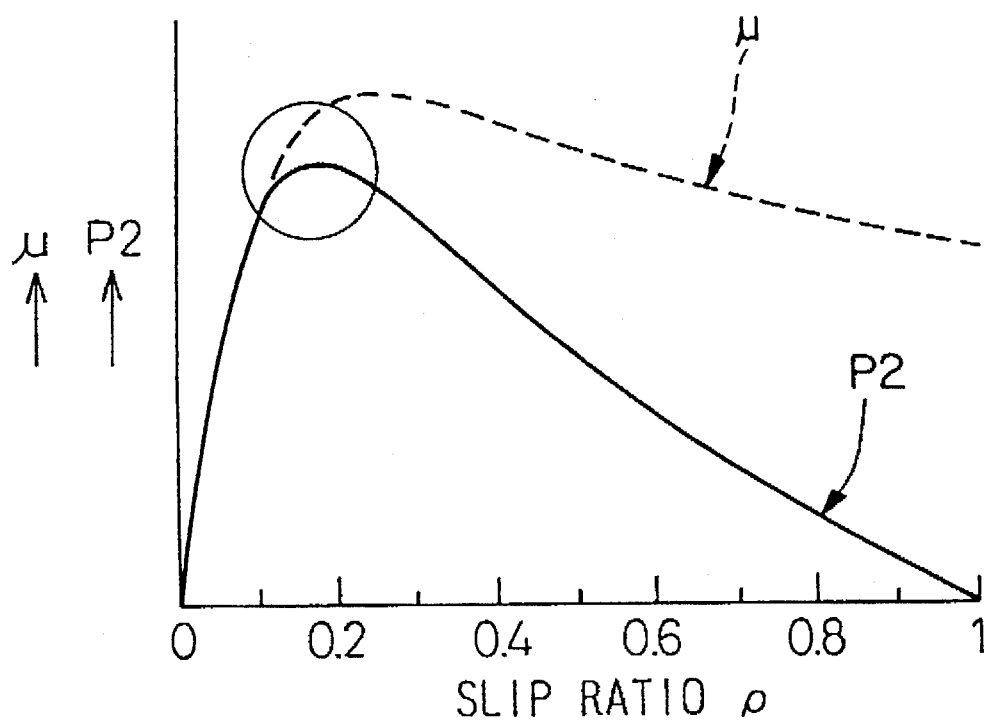
FIG. 5 is a graph showing relationships among a slip ratio, a wheel-to-road frictional coefficient, and the regenerative energy of a motor.

FIG. 4 is a graph based on the expression (8). FIG. 5 is a combinational graph of the graphs of FIGS. 3 and 4. The motor regenerative energy P2 reaches its maximum value in the stable range before the wheel-to-road frictional coefficient $\mu$ reaches its maximum value, as shown in FIG. 5.

It is understood from FIG. 5 that an anti-lock regenerative braking action is realized by controlling the slip ratio $\rho$ to keep the regenerative energy at its maximum value and to maintain the wheel-to-road frictional coefficient $\mu$ around its maximum value in the stable range. The slip ratio $\rho$ is controllable by controlling the strength of regenerative braking force, i.e., the frequency of driving power, i.e., the slip S.

Figure 6:
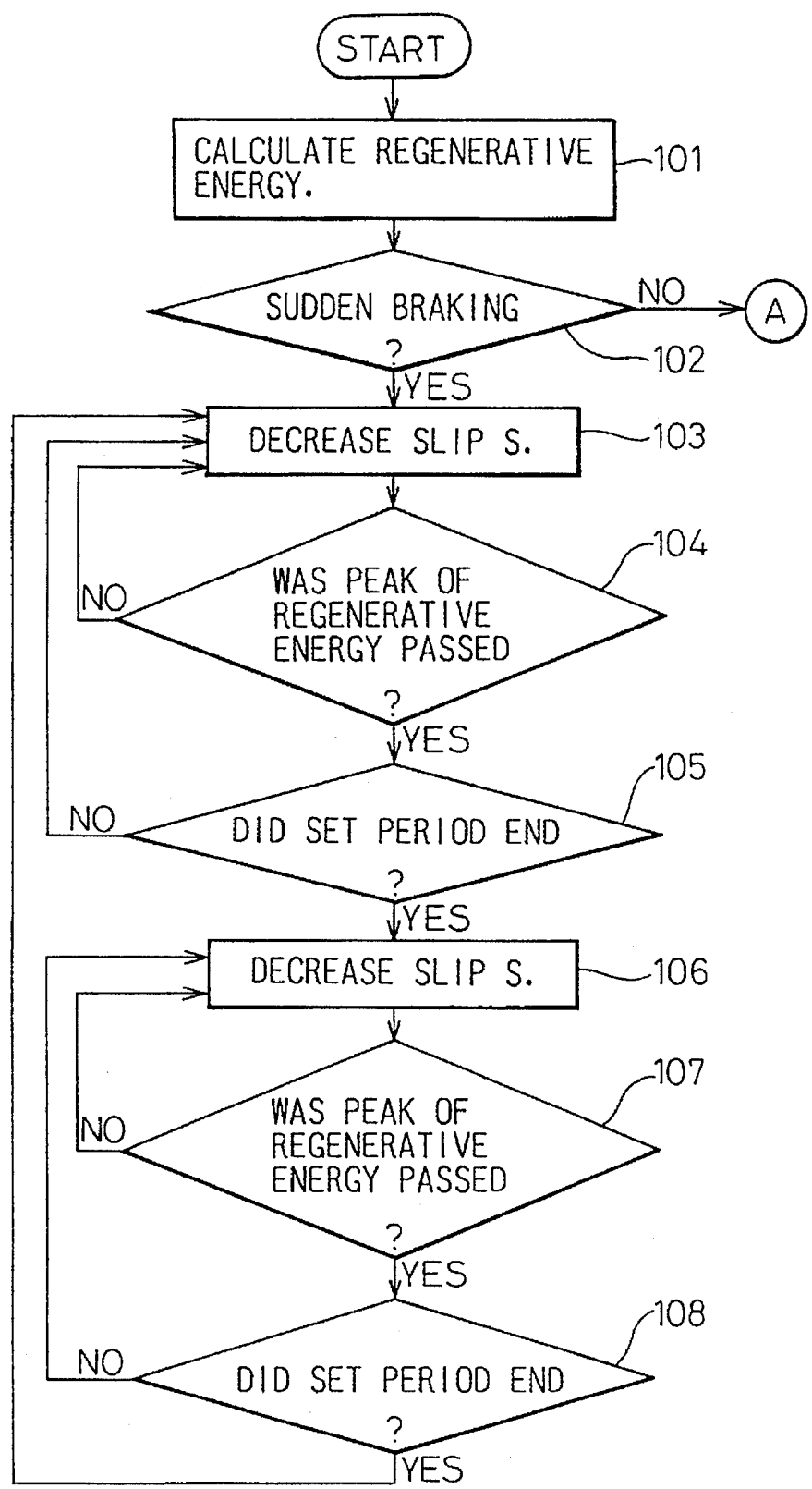
FIGS. 6 and 7 are flowcharts showing the steps of controlling a motor.
Figure 7:
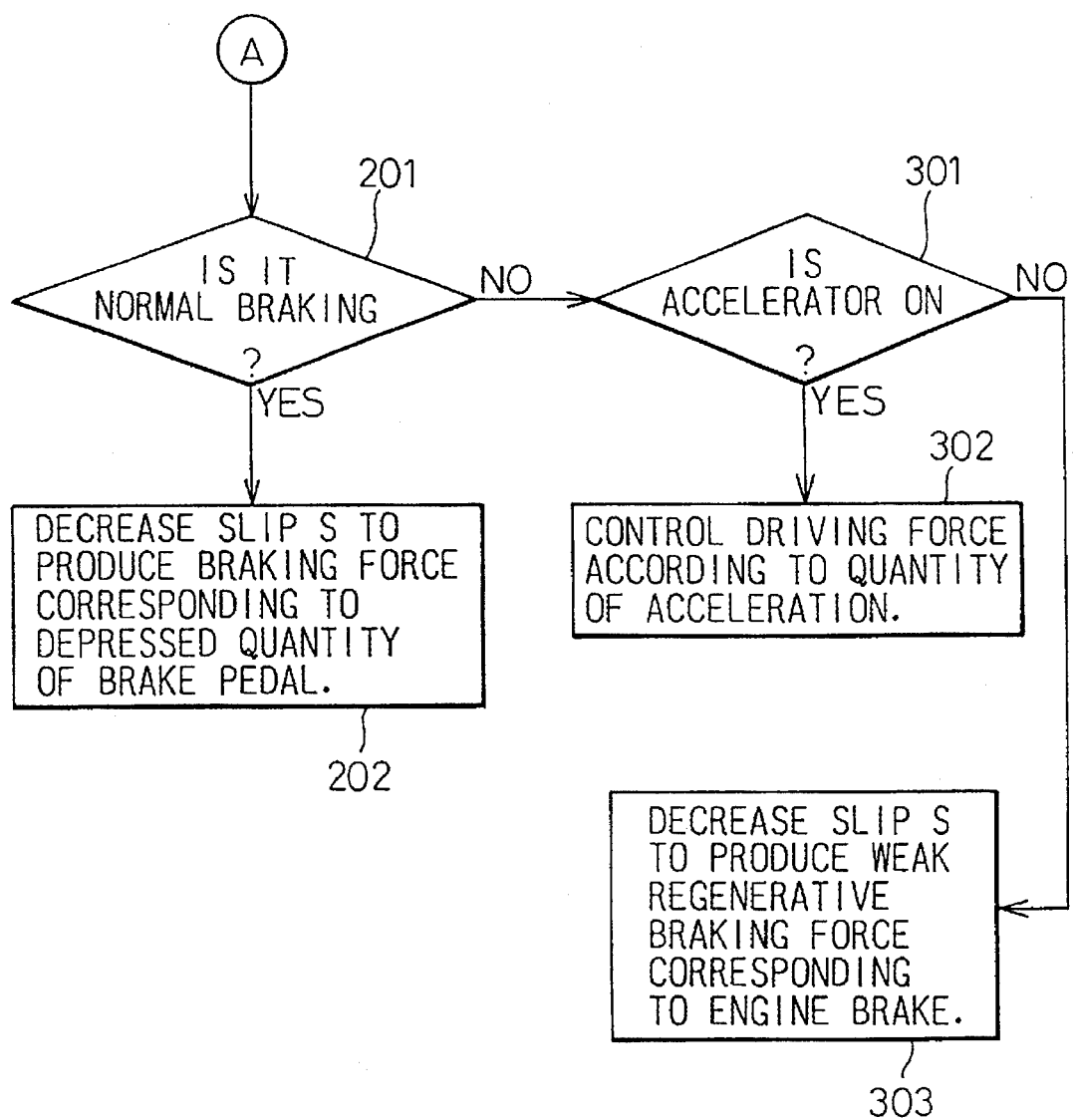
Figure 8:
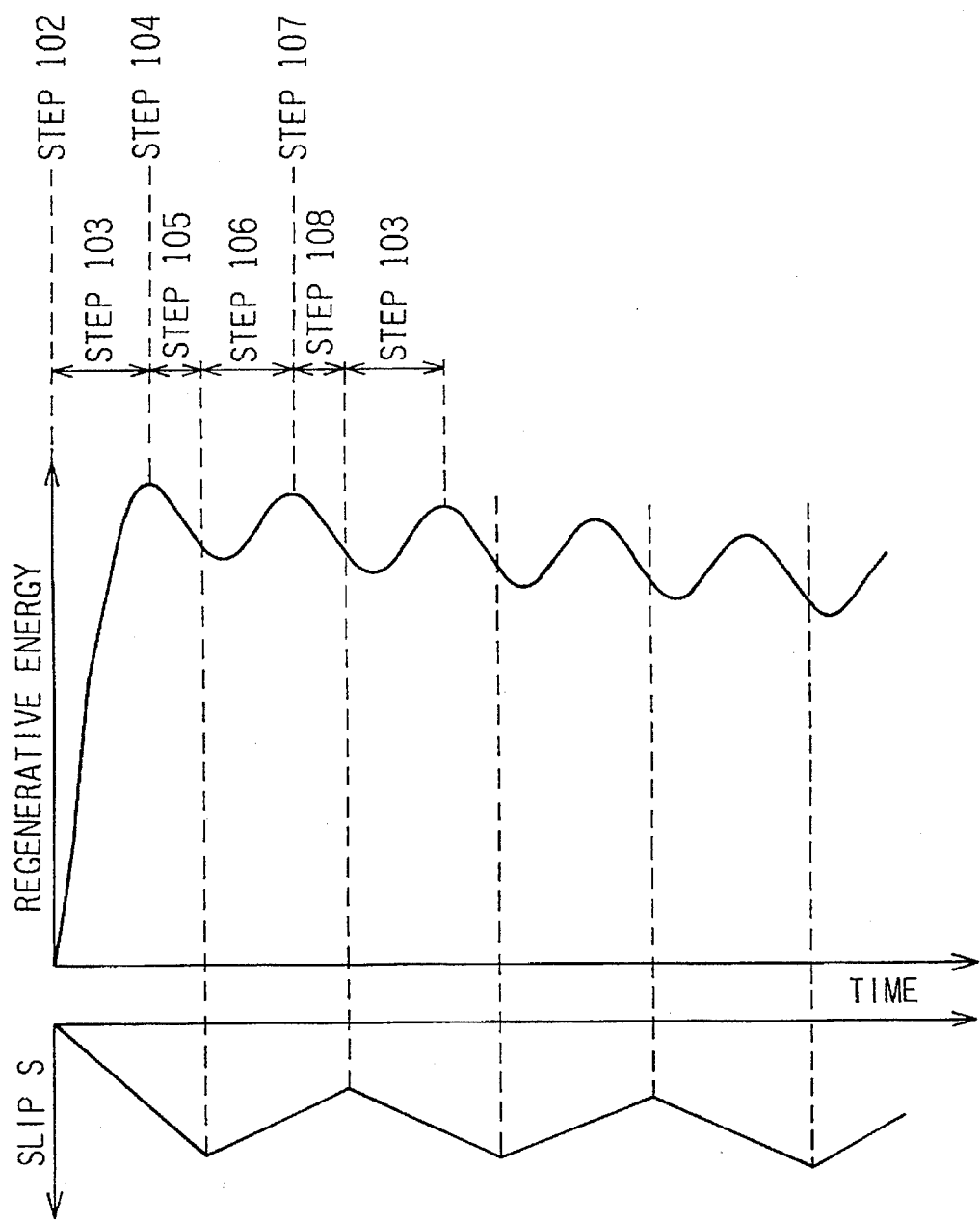
FIG. 8 shows temporal changes in regenerative energy and slip S during a regenerative braking action.

FIGS. 6 and 7 show the steps of controlling the motor 1, carried out by the CPU 42. Step 101 calculates the regenerative energy of a regenerative braking action according to the output signals 51a and 52a of the ammeter 51 and voltmeter 52. Step 102 determines whether or not a sudden braking state is present according to the output of the brake sensor 62. If it is in the sudden braking state, a regenerative anti-lock braking control is carried out from step 103.

The regenerative anti-lock braking control will be explained next with reference to FIGS. 5 through 8. The step 103 decreases the slip S of the motor 1. Namely, the step 103 provides the motor controller 2 with an output signal 4a to reduce the frequency f0 of motor driving power and negatively increase the slip S. Regenerative braking force on driving wheels gradually increases to increase the regenerative energy P2 as well as the slip ratio $\rho$ of the driving wheels. Step 104 determines whether or not the regenerative energy has reached a maximum value. If it has reaches the maximum value, the frequency f0 is continuously reduced to reduce the slip S for a given period. As a result, the slip ratio $\rho$ further increases to drop the regenerative energy P2. Step 105 determines whether or not the given period has passed. If the given period has passed, step 106 positively increases the slip S. Then, the slip ratio decreases toward an optimum value, to again increase the regenerative energy P2 toward the maximum value. Step 107 determines whether or not the regenerative energy P2 has reached the maximum value. If it has reached the maximum value, the slip S is continuously increased for a given period. Step 108 determines whether or not the given period has passed. If the given period has passed, the flow returns to the step 103 to again decrease the slip S.

The steps 103 to 108 are repeated to optimize the slip ratio $\rho$ and keeps the regenerative energy P2 around the maximum value, so that the wheel-to-road frictional coefficient $\mu$ is kept around its maximum value, to thereby realize the regenerative anti-lock braking operation.

If the step 102 determines that it is not in the sudden braking state, step 201 determines whether or not it is in a normal braking state. If it is in the normal braking state, step 202 decreases the slip S and increases negative braking force in response to a depression of the brake pedal.

If the brake pedal is not pushed down, step 301 determines according to the signal 61a of the accelerator 61 whether or not the accelerator is pushed. If the accelerator is pushed, step 302 controls the motor 1 by positively increasing the slip S in response to a depression of the accelerator. If the accelerator is not pushed, step 303 sets the slip S to a proper negative value to produce a weak regenerative braking force corresponding to an engine brake.

Figure 9:
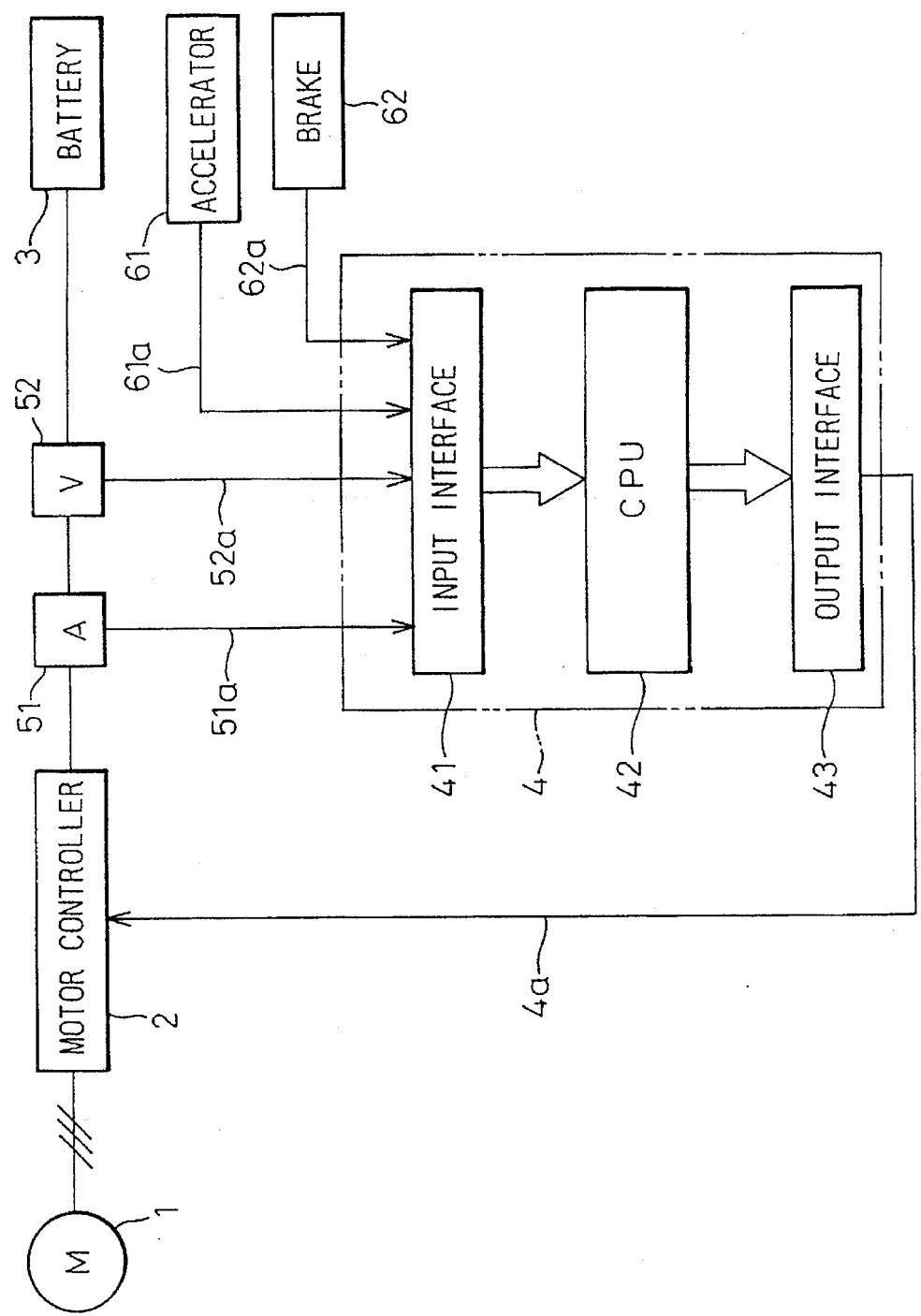
FIG. 9 is a block diagram showing a braking force controller according to a second embodiment of the present invention.

FIG. 9 shows a braking force controller for an electric vehicle according to the second embodiment of the present invention. The second embodiment arranges an ammeter 51 and a voltmeter 52 between a motor controller 2 and a battery 3. In this case, the regenerative energy P2 is calculated in the steps 104 and 107 of FIG. 6 according to the outputs of the ammeter 51 and voltmeter 52 with the use of the following expression (9) instead of the expression (6):

$$P2 = \mu i \cdot \mu m \cdot K2 \cdot n \cdot T(W) \quad (9)$$

where μm is the efficiency of the motor controller 2.

In summary, a braking force controller for an electric vehicle according to the present invention controls a regenerative braking force to maintain the regenerative energy of a vehicle motor around a maximum value, thereby keeping a wheel-to-road frictional coefficient around a maximum value and realizing a regenerative anti-lock braking action. The regenerative energy is used to charge a battery, to extend a travelling distance.

The braking force controller of the present invention employs a detector for detecting a sudden braking action, detectors for measuring regenerative energy, and a central controller for providing a motor controller with a signal to control the regenerative braking force of the vehicle motor so that the regenerative energy is kept around its maximum value, and wheel-to-road friction is kept around its maximum value.

The regenerative energy corresponds to the slip ratio of the vehicle motor and to a wheel-to-road frictional coefficient. Accordingly, if the regenerative energy during a regenerative braking action is at a maximum value, the wheel-to-road frictional coefficient will be at a maximum value. Compared with the prior art that detects the speed of a wheel and carries out an anti-lock braking operation according to the detected speed, detecting regenerative energy is more accurate and proper for the anti-lock braking operation because it is independent of the conditions of a vehicle and a road.

The present invention repeatedly controls the slip S of the vehicle motor, if the wheel-to-road frictional coefficient is out of the maximum value and the regenerative energy is not around the maximum value. As a result, the regenerative energy is kept at the maximum value, and therefore, the wheel-to-road friction coefficient is always kept around the maximum value. This results in keeping an optimum anti-lock braking state during a sudden braking operation.

The present invention employs an induction motor as a vehicle motor and controls the slip of the motor to keep the regenerative energy at the maximum value. Controlling the slip of the motor controls the quantity of the regenerative energy, thereby controlling a braking force. The slip of the motor is controlled by changing the frequency of power for driving the motor.

If the regenerative energy drops below the maximum value while the slip of the motor is being increased, the present invention decreases the slip, and if the regenerative energy drops below the maximum value while the slip of the motor is being decreased, the present invention increases the slip, thereby maintaining the regenerative energy around the maximum value.

The present invention may employ a timer, to continue the slip increasing or decreasing operation for a given period, to avoid fluctuations in the regenerative energy due to detection errors.

We claim:

1. A braking force controller for an electric vehicle having a motor for driving wheels and a motor controller for controlling power to be supplied to the motor as well as a regenerative braking force generated by the motor, comprising:

first detection means for detecting a sudden braking operation;

second detection means for detecting a regenerative energy produced by the motor; and central control means for providing the motor controller with a signal based on said detected regenerative energy to control the regenerative braking force generated by the motor so that a near maximum road surface frictional coefficient is achieved only by maintaining the detected regenerative energy at around a maximum value during the sudden braking operation detected by the first detection means.

2. The braking force controller as claimed in claim 1, wherein the central control means increases the regenerative energy up to the maximum value if the regenerative energy decreases below the maximum value, and repeats this process.

3. The braking force controller as claimed in claim 1, wherein the motor is an induction motor, and the central control means controls the slip of the motor, to control the regenerative braking force of the motor.

4. The braking force controller as claimed in claim 3, wherein the power supplied to the motor is a signal having a frequency and the slip of the motor is controlled by controlling the frequency of the signal supplied to the motor.

5. The braking force controller as claimed in claim 3, wherein the central control means controls the slip of the motor by one of increasing the slip of the motor when the slip of the motor is decreasing, and decreasing the slip of the motor when the slip of the motor is increasing, when the regenerative energy drops below the maximum value.

6. The braking force controller according to claim 3, wherein the central control means has a timer for measuring a predetermined period during which the central control means fixes one of an increase and a decrease in the slip of the motor.

7. The braking force controller according to claim 1, wherein the central control means provides a maximum road-surface frictional coefficient without the aid of wheel-speed sensors.

8. A braking force controller for an electric vehicle, comprising:

a detector adapted and constructed to detect a regenerative energy produced by a motor of said electric vehicle for driving wheels of said vehicle; and a control, based on said detected regenerative energy, adapted and constructed to obtain a near maximum road-surface frictional coefficient of said wheels only by maintaining said detected regenerative energy to be around a maximum value.

* * * * *